US009557521B2

(12) United States Patent
Nowak et al.

(10) Patent No.: US 9,557,521 B2
(45) Date of Patent: Jan. 31, 2017

(54) OPTICAL GUIDE SYSTEM FOR GUIDING AT LEAST ONE OPTICAL LENS

(71) Applicant: Trimble Jena GmbH, Jena (DE)

(72) Inventors: Matthias Nowak, Jena (DE); Wolfgang Hahn, Bürgel (DE)

(73) Assignee: Trimble Jena GmbH, Jena (DE)

(*) Notice: Subject to any disclaimer, the term of this patent is extended or adjusted under 35 U.S.C. 154(b) by 174 days.

(21) Appl. No.: 14/605,309

(22) Filed: Jan. 26, 2015

(65) Prior Publication Data
US 2015/0253533 A1  Sep. 10, 2015

(30) Foreign Application Priority Data
Mar. 10, 2014 (DE) .................. 10 2014 204 325

(51) Int. Cl.
| | |
|---|---|
| G02B 7/00 | (2006.01) |
| G02B 7/04 | (2006.01) |
| G02B 7/10 | (2006.01) |
| G02B 7/02 | (2006.01) |

(52) U.S. Cl.
CPC ............. G02B 7/04 (2013.01); G02B 7/005 (2013.01); G02B 7/028 (2013.01); G02B 7/102 (2013.01)

(58) Field of Classification Search
CPC .............. G02B 7/04; G02B 7/10; G02B 7/003
USPC 250/216, 222.1, 239; 359/819, 823; 396/73, 87
See application file for complete search history.

(56) References Cited

U.S. PATENT DOCUMENTS

| | | | | |
|---|---|---|---|---|
| 5,748,394 A | * | 5/1998 | Shimazaki | G02B 7/08 359/822 |
| 2007/0122136 A1 | * | 5/2007 | Kawaguchi | G02B 7/102 396/87 |

FOREIGN PATENT DOCUMENTS

| | | |
|---|---|---|
| DE | H10142511 A | 5/1998 |
| DE | 10 2005 038262 A1 | 8/2005 |
| DE | 20 2012 004 116 U1 | 5/2012 |
| EP | 1510846 A1 | 3/2005 |
| JP | H1152212 A | 2/1999 |

* cited by examiner

*Primary Examiner* — Kevin Pyo
(74) *Attorney, Agent, or Firm* — Kilpatrick Townsend & Stockton LLP (57) ABSTRACT

An optical guide system is provided for guiding an optical lens along an optical axis of the guide system. The optical guide system has a guide housing for accommodating a guide carriage, wherein an inner guide surface thereof extends along the optical axis. The guide carriage is arranged within the guide housing, movably between a start position and an end position and suitably to secure the at least one optical lens. The guide carriage also has a sliding element which is in contact with the inner guide surface of the guide housing and which enables sliding of the guide carriage. The optical guide system also has a suspension element which is connected to the guide carriage and by means of which the guide carriage is mechanically coupled to a drive. The optical guide system also has a tensioning element which is arranged outside the guide housing and which cooperates with the suspension element, causing a tensioning force which acts on the guide carriage so that the at least one sliding element lies against the inner guide surface of the guide housing.

20 Claims, 7 Drawing Sheets

OPTICAL GUIDE SYSTEM FOR GUIDING AT LEAST ONE OPTICAL LENS

CROSS-REFERENCE TO RELATED APPLICATIONS

This application claims priority to German Application No. 10 2014 204 325.5, filed Mar. 10, 2014, the entire contents of which are incorporated herein by reference in their entirety for all purposes.

FIELD OF THE INVENTION

The present invention relates to an optical guide system for guiding at least one optical lens, for example, within a zoom arrangement of an optical instrument such as a total station or a tachymeter.

BACKGROUND OF THE INVENTION

Zoom and focusing arrangements are used as suitable arrangements of optical lenses in order suitably to set a focal length of an optical instrument. These can be used to set a magnification that is achievable with the optical instrument. Typically, for this purpose, arrangements of optical elements such as lenses or lens groups are used, of which at least one lens or a lens group is arranged movable along an optical axis of the arrangement. For example, in a suitable arrangement, a movable lens group can be provided for suitable zooming, and a movable lens group for setting the focus. By setting a position of this movable lens in relation to the optical axis, the focal length of the lens system and thus the magnification of the optical instrument is set. Zoom arrangements of this type are used in microscopes, cameras and particularly also in total stations or tachymeters.

Particularly in the field of total stations and tachymeters, a high level of accuracy and reproducibility in setting the position of the movable lens is of great importance. In the design of the relevant lens arrangements, it is necessary to keep tolerances which can arise, for example, from drive motors of the movable lens or a corresponding lens mounting, as small as possible. It has been found inter alia that positional errors of the drive motors in particular can have an influence on the setting accuracy and reproducibility of a desired position if the adjustable lens is to be moved from different starting directions, for example, into a desired reference position. It is therefore desirable inter alia that a movable lens or lens group is always moved from the same direction into the desired position or into a reference position.

Modern zoom and focusing arrangements for use, for example, in total stations or tachymeters are usually very compactly designed. It is thus also desirable that a drive system for a movable lens or a movable lens group enables a compact arrangement of the lenses within such a zoom and focusing arrangement.

An example of a conventional lens mounting is described in the patent application EP 1 510 846 A1. Therein, a guide system for optical systems is described in which lenses or lens groups can be displaced in relation to one another. The system proposed therein has a housing extending along an optical axis in which suitable guide carriages for accommodating optical lenses are arranged. These guide carriages have the form of sleeve segments or cylinder segments which have sliding elements on their outer surfaces lying against corresponding inner guide surfaces of the housing. The sleeve segments proposed therein are at least partially manufactured from a magnetizable material and are guided on the guide surfaces of the housing by the effect of suitable magnetic forces.

A further example of an optical guide system is described in the application WO 2013/135313 A1. Therein, an essentially cylindrical guide carriage for accommodating optical elements and which is guided within a cylindrical housing is proposed. As described therein, the guide carriage is mounted with the aid of pairs of sliding elements of which a pair is adjustable by rotation in order to ensure play-free mounting. The guide carriage is connected via a suitable coupling to a drive, by means of which the guide carriage is displaceable within the housing along an optical axis.

In the application US 2007/0122136 A1, a device for determining the position of a guide carriage within a corresponding housing is disclosed. For this purpose, a sensor in the form of a light barrier is provided at the housing and, at the guide carriage, a suitable interrupter element. The interrupter element is therein arranged such that, on a movement of the guide carriage along the optical axis, the interrupter element interrupts the light barrier so that, for example, a desired reference position of the guide carriage within the housing can be determined using the corresponding signal of the light barrier.

It is an object of the present invention to improve the prior art and to provide an optical guide system with which an optical element such as an optical lens or lens assembly can be reproducibly positioned within a guide housing with a high degree of accuracy and, for example, can be moved into a reference position.

SUMMARY OF THE INVENTION

This object is achieved with the subject matter of claim 1. Preferred embodiments are described in the dependent claims.

According to the present invention, an optical guide system is provided for guiding at least one optical lens along an optical axis of a guide system. In a preferred embodiment, the lens can be part of an optical arrangement of a total station. In one embodiment, the optical guide system can also be suitable for guiding an optical arrangement of a plurality of lenses. According to the present invention, the optical guide system has a guide housing for accommodating a guide carriage within the guide housing, wherein an inner guide surface of the guide housing extends along the optical axis, in other words substantially parallel to the optical axis. The guide housing can enclose the guide carriage wholly or partially. According to the invention, the guide carriage is arranged within the guide housing movable along the optical axis between a start position and an end position and suitably to secure the at least one optical lens. The start position and the end position can be pre-determined by the geometry of the guide housing and preferably correspond to a wide-angle setting and a narrow-angle setting of a lens arrangement which comprises the mounted lens. The securing of the optical lens within the guide carriage can be carried out in the conventional manner, as known to a person skilled in the art, for example, by using suitable screw-fixable or tensionable holding rings.

According to the present invention, the guide carriage has at least one sliding element which is in contact with the inner guide surface of the guide housing and which enables or permits sliding of the guide carriage within the guide housing along the optical axis. The at least one sliding element can be configured to be integral with the guide carriage or can be provided as a separate sliding element which is mounted in a suitable manner on the guide carriage. If a plurality of sliding elements is provided, they can be configured both integrally with the guide carriage and also in the form of separate sliding elements.

The at least one sliding element and the guide carriage can be made, for example, from a suitable plastics material. In a preferred embodiment, the at least one sliding element is an essentially oil-free plastics sliding element. This material selection enables, for example, a simple adaptation of the sliding element to the shape of the inner guide surface and enables advantageous sliding of the sliding element along the guide surface during a movement of the guide carriage. At the same time, it is ensured by dispensing with oil that optical elements such as the movable lens are not soiled with oil. Preferably, the sliding element is mounted as a separate sliding element on the guide carriage.

The at least one sliding element is in contact with the inner guide surface of the guide housing if the guide carriage is accommodated within the guide housing, and permits sliding of the guide carriage along the optical axis. The movement of the guide carriage can take place substantially parallel to the optical axis of the system or at a suitably set angle in relation to the optical axis, as can suitably be provided by a person skilled in the art. Preferably, the movement of the guide carriage within the guide housing takes place substantially parallel to the optical axis. As a person skilled in the art would deem sensible, the expressions "parallel" or "perpendicular" as used here are considered able to lie within the normal technical tolerances, which are preferably within a range of approximately 0.1% to 10%, preferably within a range of 0.1% to 1%.

According to the present invention, the optical guide system also has a suspension element which is mechanically connected to the guide carriage and by means of which the guide carriage is mechanically coupled through a cut-out in the guide housing to a drive outside the guide housing. The drive is preferably a stepper motor which, through the possibility of the setting of step counts, enables a reproducible position setting of the guide carriage within the guide housing.

The optical guide system according to the present invention also has a tensioning element which is arranged outside the guide housing and which cooperates with the suspension element, causing a tensioning force which acts on the guide carriage so that the at least one sliding element lies against the inner guide surface of the guide housing, preferably is pressed against the inner guide surface of the guide housing, so that a suitable play-free contact between the glide element and guide surface is created.

In other words, the tensioning element which is arranged outside the guide housing cooperates with the suspension element in such a way that it presses the guide carriage within the guide housing, for example, against the inner guide surface such that the at least one sliding element is pressed against this inner guide surface. The tensioning force is set so that sliding of the guide carriage within the guide housing between a start position and an end position is possible.

This mounting of the guide carriage makes it possible for the guide carriage to be in contact only via the at least one sliding element with the inner guide housing. This makes possible a particularly stable tilt-proof arrangement which contributes to a high degree of accuracy and reproducibility for a setting of the position of the guide carriage within the guide housing. This mounting further contributes in an advantageous manner thereto that the guide carriage does not jam against the guide housing when moving within the guide housing.

In a preferred embodiment, the stepper motor is configured in such a way as to drive the guide carriage such that the start position and the end position of the movement of the guide carriage within the guide housing along the optical axis represent respectively a wide-angle setting and a narrow-angle setting of the lens. Through the use of a stepper motor, it is possible in this embodiment to move to the wide-angle setting and the narrow-angle setting of the lens reproducibly by specifying a suitable step count.

In order to increase further the reproducibility of the setting of a position of the guide carriage within the guide housing, it is advantageous always to move, for example, to a desired reference position within the guide housing from the same side. In this way, positioning errors of, for example, the drive motor when setting the position of the guide carriage within the guide housing, and therefore of the lens position, are minimized.

In order to enable this, in a preferred embodiment of the present invention, the optical guide system comprises a light barrier and an interrupter element. The light barrier is arranged on the guide housing or on the guide carriage and the interrupter element is arranged on the corresponding other guide housing or guide carriage. The interrupter element is arranged and configured such that, during the movement of the guide carriage from the start position to the end position, the interrupter element is guided between a light emitting section and a light receiving section of the light barrier, and thereby changes a signal of the light barrier by means of at least partial transmission or at least partial interruption of a light beam of the light barrier such that the light barrier emits a different signal when the guide carriage is in the start position than when the guide carriage is in the end position.

The interrupter element is also arranged and configured so that, during a unidirectional movement of the guide carriage between the start position and the end position, the signal of the light barrier at least partially reverses at least three times.

Through the provision of the interrupter element in this manner, in this embodiment it is made possible for the light barrier to output an asymmetric signal on a unidirectional movement of the guide carriage, wherein the signal of the light barrier when the guide carriage is in the start position differs from the signal of the light barrier when the guide carriage is in the end position. Therebetween, the signal reverses at least three times. It is thus possible to move the guide carriage always from the same side into a reference position within the guide housing.

Thus an increased level of reproducibility and accuracy when approaching a reference position can be achieved if it is always approached from the same direction. As is evident to a person skilled in the art, according to the present invention, it is possible for the light barrier and the interrupter element to be provided independently, for example, for a zooming or focusing arrangement in which movable lenses or lens groups are provided in a known manner.

DETAILED DESCRIPTION OF THE PREFERRED EMBODIMENTS

Figure 1:
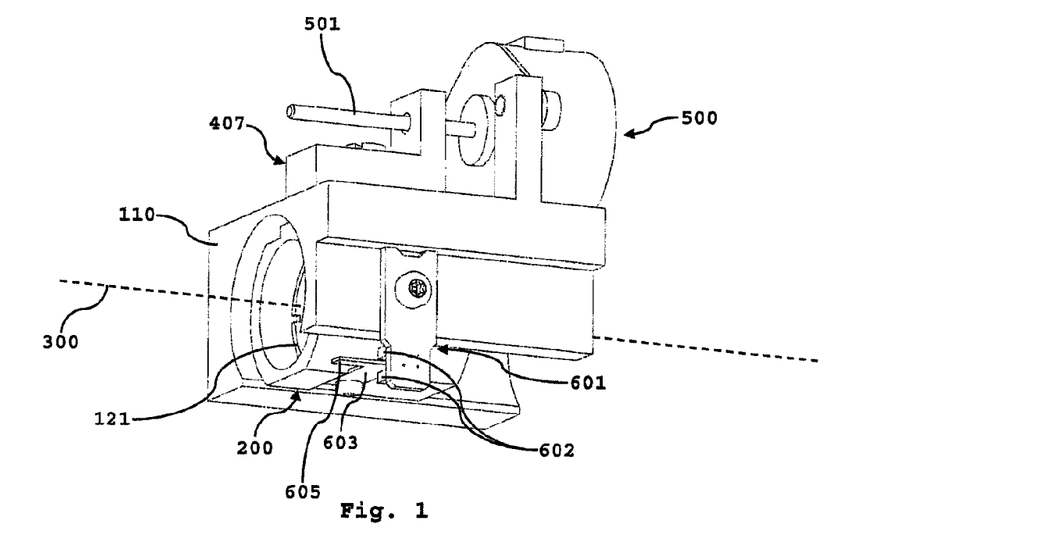
FIG. 1 shows a schematic representation of an optical guide system for guiding at least one optical lens according to an embodiment of the present invention.

FIG. 1 shows a schematic perspective view of an optical guide system according to an embodiment of the present invention. As shown, the optical guide system comprises a guide housing 110 in which a guide carriage 200 is accommodated. The guide carriage 200 is connected to a coupling carriage 407 as described in greater detail below. The coupling carriage 407 is in engagement with a drive shaft 501 which can be rotated by a drive, preferably a stepper motor. On rotation of the drive shaft, the coupling carriage 407 moves essentially along an optical axis 300 of the optical guide system and thus also moves the guide housing 110 along the optical axis 300.

The guide carriage 200 serves to hold an optical lens 120 (see FIG. 3) which, in the embodiment shown, is accommodated in the guide carriage and is secured therein, for example, by means of a suitable holding ring 121. The lens 120 can be held in the guide carriage 200 by other means known to a person skilled in the art.

The lens 200 can be, for example, part of a zoom arrangement which accommodates further lenses. By means of the movement of the lens, in such an arrangement, for example, a diameter of a light beam which propagates along the optical axis 300 can be altered. It can be advantageous, in particular for use in a total station, if a start position and an end position of the guide carriage within the guide housing 110 respectively correspond to a wide-angle setting and a narrow-angle setting of a lens arrangement which comprises the lens 120 held by the guide carriage 200.

As also shown in FIG. 1, the optical guide system also comprises a light barrier 601 which is provided with sections 602 of which one is a light-emitting section and the other is a light-receiving section. For example, in FIG. 1, the upper section 602 can be the light-emitting section and the lower section 602 in FIG. 1 can be the light-receiving section. The light-emitting section can, for example, comprise a light-emitting diode which emits light in the visible or the infrared region. The light-receiving section can comprise a suitable light sensor such as a suitable photodiode.

Figure 3:
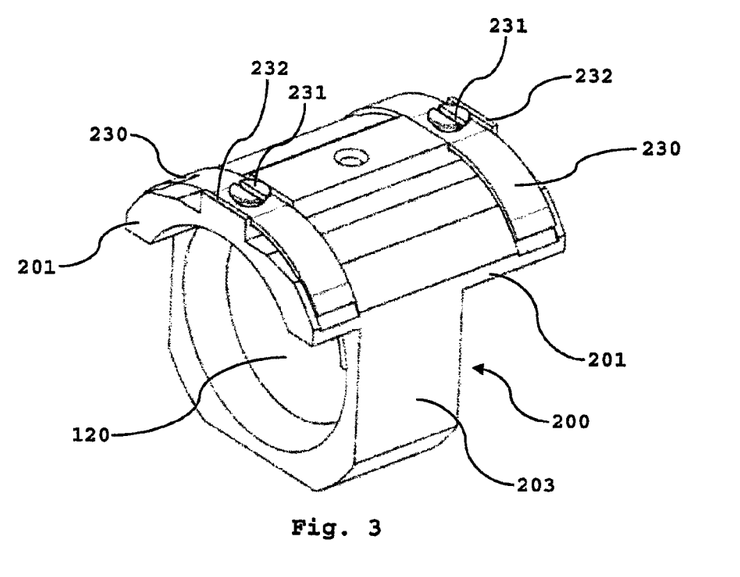
FIG. 3 shows a guide carriage of an optical guide system according to an embodiment of the present invention.

Furthermore, the optical guide system comprises an interrupter element 603 which in FIG. 3 is mounted on the guide carriage 200. The interrupter element 603 also comprises an interrupter section 605 which, on a movement of the guide carriage 200, is moved between the sections 602 and thereby at least partially blocks a light beam of the light barrier and thus alters a signal of the light barrier.

In a preferred embodiment, the light barrier 601 is arranged essentially centrally between the start position and the end position in relation to the optical axis 300. The start and end positions do not have to coincide with respective ends of the guide housing 110, as shown, for example, in FIG. 1. In other words, the guide housing can extend beyond the start and end positions. However, it has proved to be advantageous if the start and end positions essentially coincide with respective ends of the guide housing. Then, in a preferred embodiment, the dimension of the interrupter section along the optical axis essentially corresponds to half the length of the guide housing 110 along the optical axis 300. The functioning of the light barrier 601 and of the interrupter element 603 are described below in relation to FIGS. 5 to 7.

Figure 2:
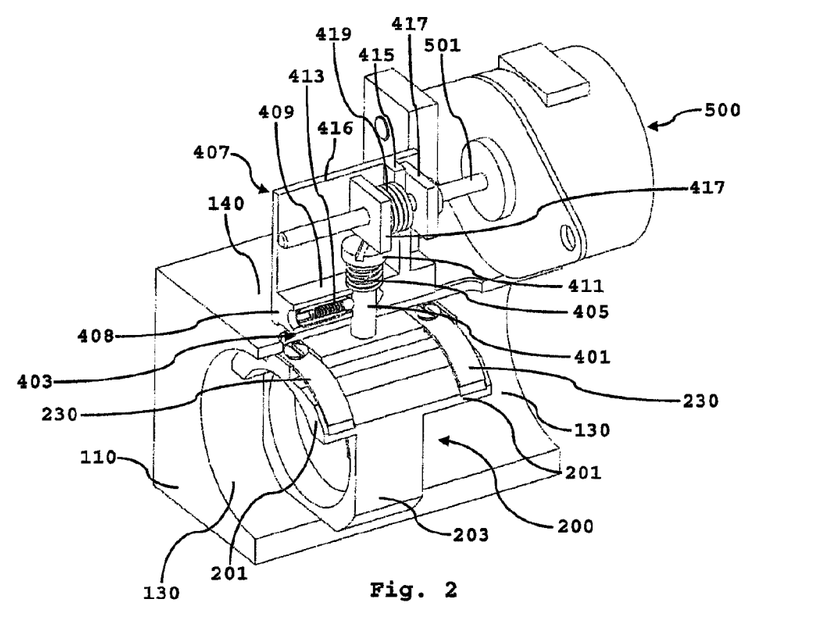
FIG. 2 shows a sectional view of the optical guide system of FIG. 1.

In FIG. 2, the optical guide system of FIG. 1 is shown in a partially sectional view. As shown in FIG. 2, the optical guide system according to a preferred embodiment has a coupling carriage 407 which is movably arranged on an outer surface 140 of the guide housing 110. As the figure shows, the coupling carriage 407 of FIG. 2 essentially corresponds to the coupling carriage 407 of FIG. 1 where, in the coupling carriage 407, a side wall 416 is differently designed. Apart therefrom, the coupling carriages of FIGS. 1 and 2 are identical with regard to their function and design.

As can also be seen from the drawings, with the movable arrangement of the coupling carriage on and along the outer surface 140, a particular stability of the movement of the coupling carriage is achieved, which is reflected in a particularly high level of accuracy of the movement of the guide carriage 200 within the guide housing 110. As shown in the figure, the coupling carriage 407 is preferably configured such that, at least in a contact region with the outer surface 140 of the guide housing 110, it has a contact surface (not shown in the drawing) extending at least in the direction of the optical axis and substantially parallel to the outer surface 140.

The coupling carriage 407 is also preferably connected to the drive in such a way that, on a rotary movement of a drive shaft 501 of the drive 500, the coupling carriage is moved linearly along the optical axis 300, wherein the suspension element 401 is mechanically connected to the coupling carriage 407. In other words, the stepper motor 500 drives a drive shaft 501 which cooperates with the coupling carriage 407 in order to convert a rotary movement of the drive shaft 501 into a translational movement of the guide carriage 200. As is further shown by the figure, the coupling carriage 407 also has a coupling projection 415 which is clamped or tensioned between nut elements 417 by means of a suitable coupling spring 419. The nut elements are mounted on the drive shaft 501 such that, on rotation of the drive shaft 501, they move in the direction of the optical axis 300. This type of coupling of the coupling carriage 407 to the drive shaft 501 has proved to be particularly advantageous since it firstly enables a suitably play-free coupling and secondly is suitably flexible and is therefore very durable.

As FIG. 2 shows, in a preferred embodiment, the tensioning element 405 is arranged between a contact surface 409 of the coupling carriage 407 and a holding projection 411 of the suspension element 401. The tensioning force is transmitted by means of the suspension element to the guide carriage 200 so that the at least one sliding element 230 is pressed against the inner guide surface 130 of the guide housing 110 such that said sliding element is able to slide in relation to the guide surface 130. At the same time, the guide carriage 200 is thereby stably held within the guide housing 110.

In FIG. 2, the guide carriage 200 is provided with two sliding elements 230 which are configured as separate sliding elements which are fastened to the guide carriage 200 by screws. The sliding elements 200 are made of a suitable material which enables sliding of the sliding element along the inner guide surface 130 of the guide housing 110. Preferably, the sliding elements 230 are manufactured from an oil-free plastic material.

Preferably, the tensioning element 405, as shown in FIG. 2, is a spring and the suspension element 401 is essentially bolt-shaped with a head section, from which the holding projection 411 extends in an annular form around an end section of the suspension element 401. As shown in FIG. 2, the suspension element 401 can preferably be a screw. The suspension element 401 is most preferably a shoulder stud which enables it to be screwed down to the stop and thereby contributes to the stability of the system and overall to the improvement of the accuracy. On a movement of the guide carriage 200 within the guide housing, the suspension element 401 moves within a cut-out 403 which is formed longitudinally, essentially along the optical axis 300.

A tensioning force which results from the tensioning element 405 being arranged under tension between the holding projection 411 and the contact surface 409 is transmitted by means of the holding element 405 to the guide carriage 200 and pulls the guide carriage upwardly in FIG. 2. By this means, the sliding elements 230 are pressed against the inner guide surface 130 without play. The tensioning force is set such that a movement of the guide carriage 200 along the optical axis is still possible. At the same time, however, the tensioning force is set suitably large such that stable holding of the guide carriage 200 within the guide housing 110 is ensured.

With this stable securing and the suitably play-free pressing of the guide carriage 200 by means of the sliding elements 230 against the guide surface 130, the guide carriage is secured in a particularly tilt-proof manner and reliably against jamming in the guide housing. It has also been found that the suspension of the guide carriage leads, through the provision of the sliding elements 230 at only one side of the guide surface 130 as shown in FIG. 2, particularly to securing against tilting and against jamming.

As is further shown in FIG. 2, in a preferred embodiment, the coupling carriage 407 comprises a support section 408 which comprises the contact surface 409. The suspension element 401 extends through a suspension aperture in the support section 408 substantially perpendicularly to the optical axis 300 through the cut-out 403. Thus, the spring 405 is compressed between the annular projection 411 of the suspension element 401 and the contact surface 409 such that a spring force acts on the suspension element 401 preferably in a direction substantially perpendicular to the optical axis 300 from within the guide housing 110 to outside the guide housing 110.

As also shown by FIG. 2, in a preferred embodiment, the coupling carriage 407 also has a holding spring element 413, preferably a spring bolt. The holding spring element 413 is arranged on the coupling carriage 407 such that within the suspension opening, said holding spring element exerts a spring force onto the suspension element 401, preferably in a direction substantially parallel to the optical axis 300. Through the provision of the holding spring element 413, it is possible in an advantageous manner to hold the suspension element by simple means without play in the suspension opening of the coupling carriage, which increases the precision during guiding of the guide carriage within the guide housing 110.

As shown in FIG. 3, the sliding elements 230 are fastened with suitable screws 231 to the guide carriage 200. The screws are provided here in such a way that their heads do not protrude, for example, beyond the projections 232 of the guide carriage 200 and thus do not prevent a movement of the guide carriage 200 within the guide housing. As a person skilled in the art would recognize, in place of the screws 231 shown, other holding means are possible, as a skilled person knows. FIG. 3 further shows a schematic representation of the guide carriage 200. As shown, the guide carriage 200 preferably has at least one cylindrical section 203 with an essentially cylindrical basic form and preferably an essentially circular internal cross-section. The guide carriage 200 preferably also has at least one cylinder segment section 201 and, in FIG. 3, two cylinder segment sections 201. These cylinder segment sections 201 have, as shown, a cross-section which essentially describes a circular segment. The cylinder segment sections 201 extend in mutually opposing directions from the cylindrical section 203 essentially along the optical axis. As can be seen from FIG. 3 in particular in conjunction with FIG. 2, the provision of the cylinder segment sections 201 shown increases the tilt-proofing of the guide carriage 200 during a movement within the guide housing 110. Thus, the cylinder segment sections 201 further contribute to increasing the accuracy during positioning of the guide carriage 200 within the guide housing 110.

Figure 4:
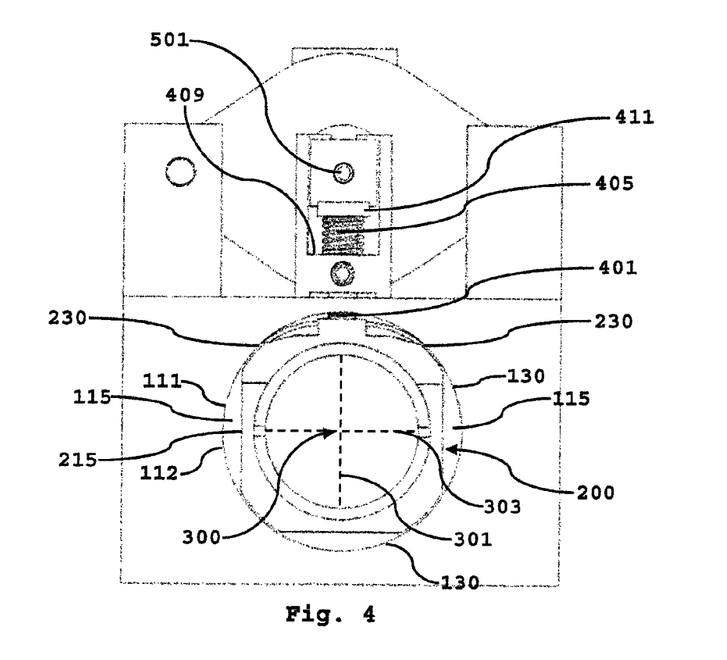
FIG. 4 shows a cross-sectional view of the optical guide system of FIG. 1.

FIG. 4 shows a cross-sectional view of the optical guide system shown in FIGS. 1 and 2. As can be seen from this drawing, the guide surface 130 along the optical axis is essentially cylindrical and, in the preferred embodiment shown, has an essentially circular cross-section. As shown, through the effect of the tensioning force, the sliding elements 230 are pressed against a first half-cylindrical surface 111 of the cylindrical guide surface 130, wherein a spacing exists between the guide carriage 200 and a second half-cylindrical surface of the cylindrical guide surface.

In that the sliding elements 230 lie only against one side of the guide surface 130, optimum tilt-proofing is achieved. Furthermore, since inter alia a spacing additionally exists on the opposing surface between the guide carriage and the guide housing, better jam-proofing is achieved. In addition, by this means, friction during a movement of the guide carriage 200 is minimized, thus promoting optimal sliding of the guide carriage 200 within the guide housing 110. In order to achieve these design advantages over the entire length of the guide housing, in a preferred embodiment the first half-cylindrical surface 111 and the second half-cylindrical surface 112 extend along the optical axis 300 over the length of the guide housing 110 from the start position to the end position of the guide carriage 200. In this way, optimum guidance of the guide carriage 200 can be achieved over the whole movement path.

It has also been found that a suitable setting of the ratio of the spacing of the sliding elements 230 in the direction of the optical axis to the overall diameter of the guide carriage (perpendicular to the optical axis) can contribute to increasing the tilt stability. As a person skilled in the art would understand, an increase in the spacing of the sliding elements 230 from one another leads to an increase in tilt stability. A force that is required to tilt the guide carriage 200 within the guide housing is thereby increased. However, it has proved to be the case that the force which the drive 500 requires to move the guide carriage within the housing is also thereby increased. In suitable tests, the inventors have discovered that an optimum ratio is achieved if the spacing between the sliding elements 230 approximately corresponds to the diameter of the guide carriage 200. Therefore, in a preferred embodiment the spacing of the sliding elements 230 along the optical axis approximately corresponds to the diameter of the guide carriage. A deviation of 10% is preferably possible therein. In other words, the diameter may be 10% greater than the spacing. Alternatively, the separation may preferably be 10% greater than the diameter.

As is apparent from FIGS. 3 and 4, the sliding elements 230 extend from the cylinder segment sections 201 along a curvature of the first half-cylindrical surface 111 such that the sliding elements 230 lie optimally against the half-cylindrical surface 111. Preferably, the sliding elements 230 extend, as shown in FIG. 3, substantially along the entire cross-section of the respective cylinder segment sections 201. Further preferably, the cylindrical section 203 is essentially a hollow cylinder with an essentially circular inner cross-section and is designed to accommodate the lens 120. Thus, the guide carriage 200 is provided in a particularly compact and simultaneously stable form.

As also shown in FIG. 4, the cylindrical section 203 has a outer guiding surface 215 with an essentially polygonal cross-section. The outer guiding surface 215 extends substantially along the optical axis 300, wherein the sliding elements 230 of this outer guiding surface 215 extend against the inner guide surface 130 of the guide housing 110. The arrangement of the sliding elements 230 on the corresponding sides of the thus polygonal-shaped outer guiding surface enables, for example, the guide carriage, where needed, to be provided in a particular orientation in the guide housing 110. In addition, well-defined positions are thus provided for the sliding elements 230, which contributes further to the stability and thus to increased accuracy in the positioning of the guide carriage 230.

As is further shown in FIG. 4, due to the polygonal form of the outer guiding surface on both sides of the guide carriage 200, free spaces 115 are formed between the guide carriage 200 and the inner guide surface 130. These free spaces 115 enable, in an advantageous manner, the use of a corresponding gripping tool (not shown) for the assembly of the guide system. A gripping tool of this type can grasp the guide carriage 200 at both sides during insertion of the guide carriage 200 into the guide housing 110. When the guide carriage 200 is placed within the guide housing 110, the relevant parts of the gripping tool then have room within the free spaces 115. Such a use of a corresponding gripping tool offers the advantage that the guide carriage can thus be inserted into the guide housing 110, if appropriate, by automated means within a clean atmosphere, which prevents, for example, possible soiling with oil of the optical components used, such as the lens 120. Preferably, the optical guide system thus has at least two free spaces 115 at mutually opposite sides of the guide carriage 200 between the guide carriage 200 and the inner guide surface 130.

Figure 5:
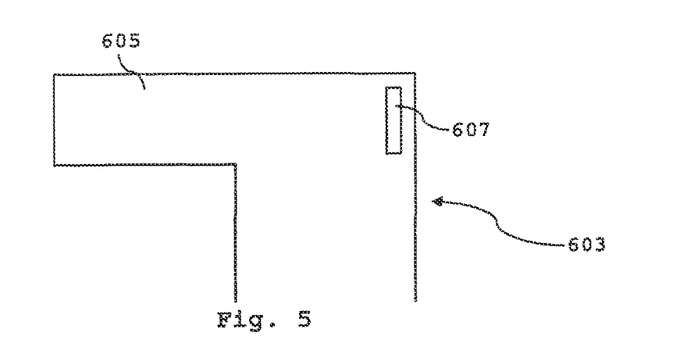
FIG. 5 shows an interrupter element of an optical guide system according to an embodiment of the present invention.

In FIG. 5, the interrupter element 603 mentioned above in relation to FIG. 1 is shown in detail. As shown, the interrupter element 603 has an essentially elongated interrupter section 605 along the optical axis 300 (see FIG. 1). The interrupter section 605 is suitable for interrupting a light beam of the light barrier 601 and, for this purpose, can be made of a non-transparent or an only partially transparent material, such as a suitable plastics material or a metal. Thus the interrupter section 605 can interrupt the light beam entirely or only partially. A partial interruption can take place, for example, with partial transmission of the light beam through a partially transparent material.

The interrupter section 605 has a light transmission section 607 which is formed in the embodiment shown as an elongated aperture. This light transmission section 607 is provided for at least partial letting through of a light beam of the light barrier 601. The light transmission section 607 can be an aperture, as shown, or can be partially transparent to the light beam. For example, in the case of partial transparency, the light transmission section can be produced from a partially transparent material or can have a diameter that is smaller than a corresponding diameter of a light beam of the light barrier. Decisive for the advantageous function described here is that the light transmission section alters the transmission of a light beam of the light barrier in comparison with the interrupter section 605 such that the signal of the light barrier differs measurably.

A usefully measurable change in the transmission of the light beam results when the interrupter section 605 attenuates the light beam by at least 10%, preferably by at least 25%, more preferably by at least 50% and most preferably by at least 75%. An attenuation by 75% means that, in the case when the interrupter section 605 interrupts the light beam, the signal of the light barrier is 25% of the signal which the light barrier emits when the light beam is not interrupted. Further, a usefully measurable change in the transmission means that the light transmission section 607 allows transmission of the light beam of at least 10%, more preferably of at least 25%, still more preferably of at least 50% and most preferably of at least 75% of the light beam. A transmission of 75% means that when the light beam passes through the transmission section, the signal of the light barrier is 75% of the signal that the light barrier emits when neither the interrupter section 605 nor the light transmission section 607 is positioned between the sections 602 of the light barrier 601. Furthermore, a usefully measurable signal difference means that the signal of the light barrier when the light beam is interrupted by the interrupter section 605 is preferably 10%, more preferably 25%, still more preferably 50% and most preferably 75% of the signal of the light barrier when the light beam passes through the light transmission section 607.

It has been found that it is advantageous to set the transmission of the light beam through the light transmission section 607 by means of a suitable choice of a diameter or a dimension of an aperture in the interrupter section 605. Preferably, a diameter or a dimension of the light transmission section 607 in the direction of the optical axis is approximately 0.5 times to 2.5 times, more preferably 0.8 times to 2 times, most preferably 1 times to 1.5 times a corresponding dimension of a light beam of the radiation source of the light barrier.

As shown in FIG. 5, the light transmission section 607 is arranged within a half of the interrupter section 605, in the preferred embodiment shown, within one end of the interrupter section 605 along the optical axis.

The arrangement of the light transmission section 607 in an asymmetrical manner in relation to a length of the interrupter section 605 along the optical axis 300 has the result that if the interrupter section 605 is moved, during a unidirectional movement of the guide carriage 200 through the sections 602, an asymmetric signal of the light barrier is produced. By this means, it is possible, based on the signal of the light barrier, to determine from which direction a reference position is approached. The reference position can be a desired position of the guide carriage 200 between the start position and the end position within the guide housing 110. This reference position is preferably reached when a light beam of the light barrier 601 passes through the light transmission section 607.

If, during a unidirectional movement of the guide carriage 200 within the guide housing, the signal of the light barrier is plotted as a function, for example, of the motor steps with a suitable graph in a two-dimensional coordinate system, the reference position within the guide housing corresponds to a setting point or a setting motor step count in this coordinate system. Alternatively, in place of the motor steps, another distance unit along the optical axis in the guide housing can be used. This setting point herein lies between points in the coordinate system which correspond to positions of the guide carriage within the guide housing at which the signal has changed. The finding of this setting point by using the interrupter element 603 will now be described making reference to FIGS. 6A to 7B.

Figure 6A:
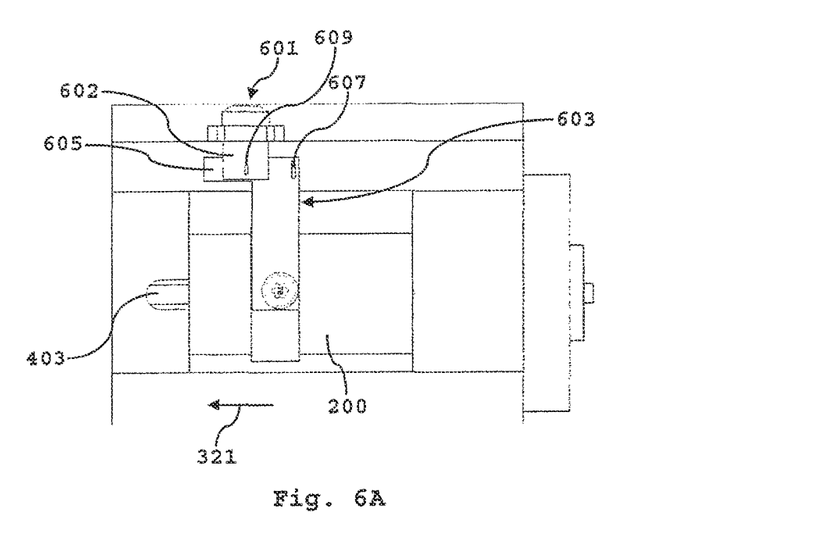
FIG. 6A shows a view of the optical guide system of FIG. 1 wherein the view corresponds to a view from below in the perspective of FIG. 1.

FIG. 6A is a view of the optical guide system of FIG. 1, from below in FIG. 1. In this drawing from below, the light barrier 601, part of the cut-out 403, the guide carriage 200 and the interrupter element 603 as well as a lower of the sections 602 are shown. Indicated by an arrow 321 is a current movement direction of the guide carriage 200 within the guide housing along the optical axis 300 (see FIG. 1).

Figure 6B:
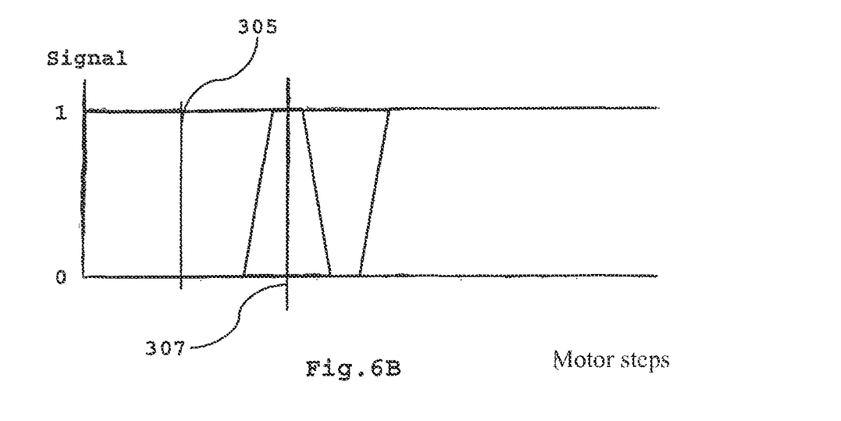
FIG. 6B shows a signal sequence of a light barrier of an optical guide system according to an embodiment of the present invention.

FIG. 6B illustrates schematically a signal of the light barrier 601 in such a unidirectional movement of the guide carriage 200 in the direction (arrow 321) shown in FIG. 6A. In FIG. 6B, a line 305 marks the position of the guide carriage 200 as shown in FIG. 6A, wherein motor steps which correspond to the distance between the start and end position within the guide housing are shown schematically on the horizontal axis. As is clear to a person skilled in the art, the number of motor steps shown is purely for illustration and can vary depending on the respective embodiment. For example, in one embodiment, the length of the guide housing can correspond to approximately 1800 motor steps.

As can be seen from FIGS. 6A and 6B, the light beam of the light barrier 601 is completely interrupted by the interrupter section 605 of the interrupter element 603 in the position of the guide carriage 200 as shown such that the signal of the light barrier is "0". In a movement of the guide carriage 200 in a direction indicated by the arrow 321, the signal initially remains "0" for as long as the light beam continues to be interrupted. As soon as the light transmission section 607 reaches the light beam of the light barrier due to the movement of the guide carriage 200 (the position of the light beam is indicated by the marking 609 in FIG. 6A), the light beam is allowed through such that, in the example shown, the signal of the light barrier 601 rises to a maximum value "1". This maximum value indicates that the light beam passes through the light transmission section 607 and that therefore the setting point has been reached. The setting point is marked in FIG. 6B with the line 307. Thus, based on the signal of the light barrier, it can be determined that the guide carriage 200 is in a reference position.

As shown in the figure, on continued unidirectional movement in the direction shown by the arrow 321, the light beam is again interrupted by a corresponding part of the interrupter section 605 so that the signal of the light barrier again falls to the value "0". If the guide carriage 200 moves further in the direction indicated by the arrow 321, the interrupter section 605 moves out of the region of the light beam such that the signal of the light barrier rises again to a maximum value "1".

As shown in FIG. 6B, the asymmetric arrangement of the light transmission section 607 within the interrupter section 605 in relation to the optical axis 300 leads to an asymmetric signal of the light barrier during a unidirectional movement of the guide carriage. As a person skilled in the art can discover from FIGS. 6A and 6B, the asymmetric signal of the light barrier makes it possible to determine unambiguously from which side the setting point is being approached. If the setting point is approached from the left in FIG. 6A, the signal sequence is "0-1-0-1". Initially, the signal is "0", changes three times and is then "1".

Figure 7A:
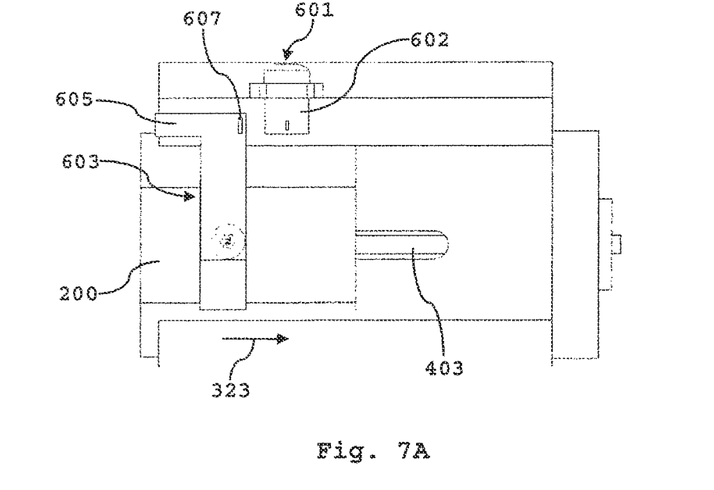
FIG. 7A shows a view of the optical guide system according to the view of FIG. 6A.
Figure 7B:
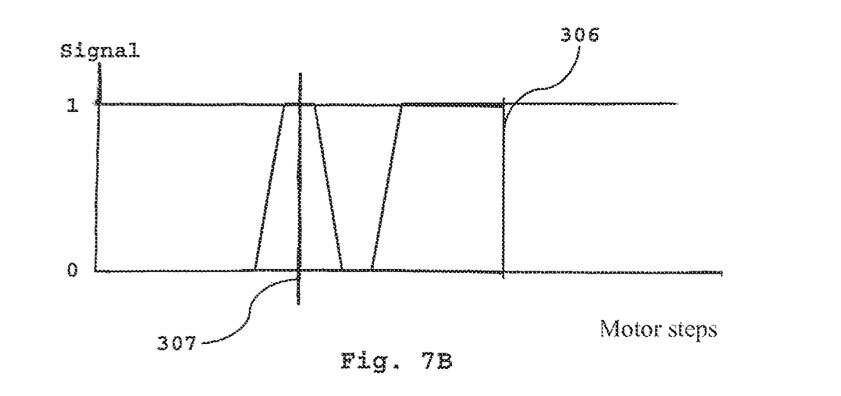
FIG. 7B shows a signal sequence of a light barrier of an optical guide system according to an embodiment of the present invention.

The signal pattern reverses when the setting point is approached from the other side. This is illustrated, by way of example, by reference to FIGS. 7A and 7B. In FIG. 7A, the guide carriage 200 is situated in a position which is marked in the signal of the light barrier 601 in FIG. 7B by the line 306. In this case, the signal of the light barrier is again maximal since the interrupter section is not yet positioned between the sections 602 of the light barrier 601. On a unidirectional movement of the guide carriage 200 in the direction shown by the arrow 323, a part of the interrupter section 605 initially interrupts the light beam of the light barrier 601, so that the signal falls to a value "0". On further movement in this direction, the light beam passes the light transmission section 607, so that the signal again rises to a maximum value, by which it is again indicated that the setting point has been reached, as shown in FIG. 7B by the line 307. On further movement in this direction, the light beam is again interrupted by the interrupter section 605 such that the signal again falls to a minimum value "0". Thus, an asymmetric signal is again produced, as shown in FIG. 7B. The signal pattern is now "1-0-1-0". Initially, the signal is "1", changes three times and is then "0". Thus, depending on the signal pattern of the light barrier 601 during a unidirectional movement of the guide carriage 200, it can be determined unambiguously from which side the reference position of the guide carriage 200 corresponding to the setting point is approached within the guide housing.

It has been found that an advantageous setting is possible if the reference position is approached in relation to the rising and falling flank of the signal. For example, the flank on the left side of the line 307 in FIG. 7B can be used as a reference. Equally, a suitable reference point on the X-axis of the signal pattern shown in FIG. 7B or a suitable motor step value can be used as a reference. A point at which, for example, the signal has reached a value of 50 percent or another percentage value at the flank on the left-hand side of the line 307 in FIG. 7B can be used as such a reference point. The use of such reference points enables advantageous approaching of the reference position. For example, initially the separation between a reference point, for example, at 50 percent of the signal at the first rising flank on the left-hand side of the line 307 and a point, for example, at 50 percent of the signal on the falling flank on the right-hand side of the line 307 can be determined. In order to determine the separation, for example, the corresponding motor steps can be counted. As show in the figure, the reference position lies exactly between these two points and thus, for example, at half the counted motor steps. It is thus possible in an advantageous manner to approach the reference positions reproducibly, regardless of temperature variations or aging processes.

Since the accuracy during approaching of a reference position is higher if such a reference position is always approached from the same side, the asymmetrical design of the interrupter section 605 and of the light transmission section 607 thus enables the accuracy and reproducibility during approaching of the reference position to be increased.

As is clear to a person skilled in the art, it is not necessary for this purpose that the signal always, or ever, rises to the maximum signal of the light barrier. For example, the signal of the light barrier can be smaller than the maximum signal when the setting point is reached, for example reaching only a value of 0.5 in FIG. 6B. It is decisive that an asymmetry of the signal, as shown in FIG. 6B, can be detected in a usefully measurable manner. As mentioned, the values 0 and 1 in FIG. 6B and in FIG. 7B and the number of motor steps shown in FIGS. 6A and 7A are arbitrarily selected and can be adapted accordingly by a person skilled in the art to the circumstances of the respective system.

Figure 8:
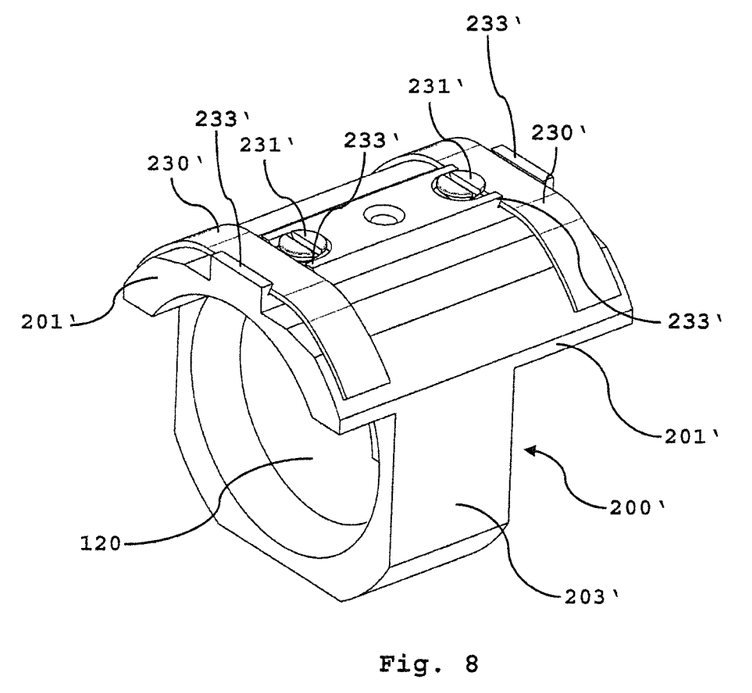
FIG. 8 shows a further embodiment of a guide carriage of an optical guide system according to the present invention.

FIG. 8 shows a schematic representation of a further embodiment of the guide carriage 200'. With regard to the embodiment shown, a further possibility for securing the sliding elements 230' on the guide carriage 200' is shown here. In this embodiment, dovetail projections 233' (not all are provided with reference signs) serve to secure the sliding elements 230' on the guide carriage. These projections 233' tension the sliding elements 230' in an advantageous manner on the guide carriage 200'. As the figure also shows, the screws 231' are arranged between pairs of projections 233' and also overlap the sliding elements 230' and thus also contribute to the fastening of the sliding elements 230' on the guide carriage 200'. The screws 231' are preferably countersunk head screws as known to a person skilled in the art, which enable the sliding elements 230' to be pressed against the projections 233'. By this means, the sliding elements 230' are tensioned between the projections 233' in an advantageous manner.

Figure 9:
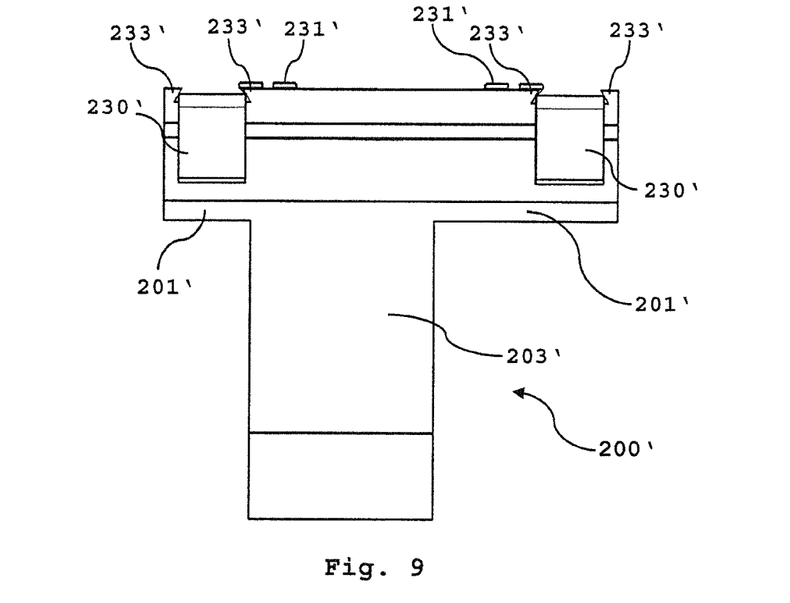
FIG. 9 shows the guide carriage of FIG. 8 in a side view.

FIG. 9 shows the guide carriage 200' in a side view. In this view, the projections 233', with which the sliding elements 230' are fastened to the guide carriage 200', are visible. As can also be seen in this view, cylinder segment sections 201' extend from the cylindrical section 203 to both sides (in the figure to the right and left). In this way, it is possible to mount an optical lens (not shown) or a lens group by means of the cylindrical section 203 so that these movable lenses can be arranged in a compact design between other immovable lenses. At the same time, the cylinder segment sections 201' extending to both sides provide for the above-mentioned advantageous stability.

As is apparent to a person skilled in the art, the dimensioning of the cylinder segment sections 201' in the present embodiment is exemplary and can be adapted to the circumstances accordingly. Furthermore, it is possible to dispense with the cylinder segments 201 and to design the guide carriage 200 completely as a cylinder. A cylinder of this type without cylinder segment sections is easier to manufacture and enables easier quality control while, however, providing the same advantageous stability and tilt-proofing.

Figure 10:
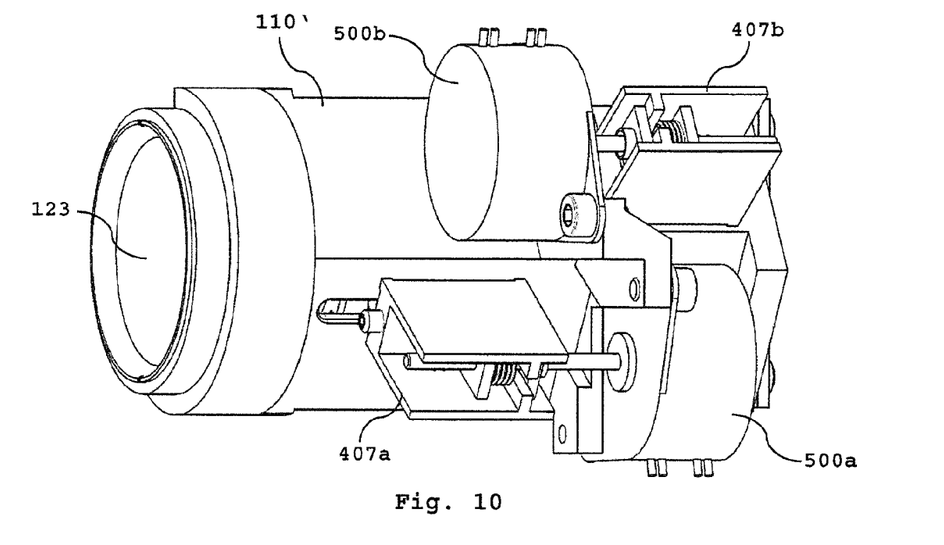
FIG. 10 shows a perspective view of an optical guide system in a further embodiment of the present invention.
Figure 11:
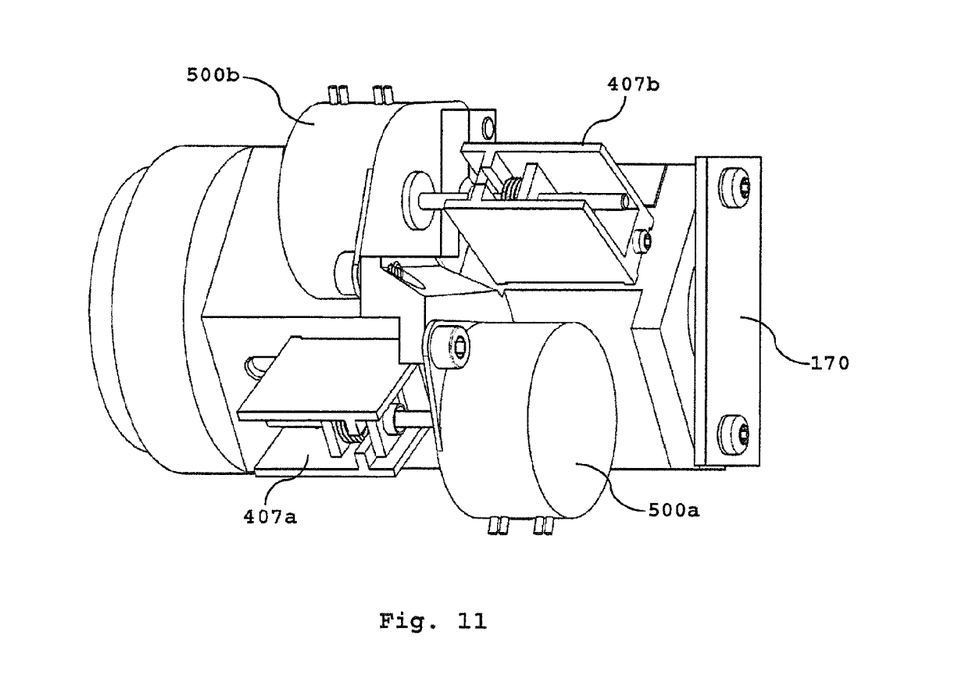
FIG. 11 shows the optical guide system according to FIG. 10 in another perspective view.
Figure 12:
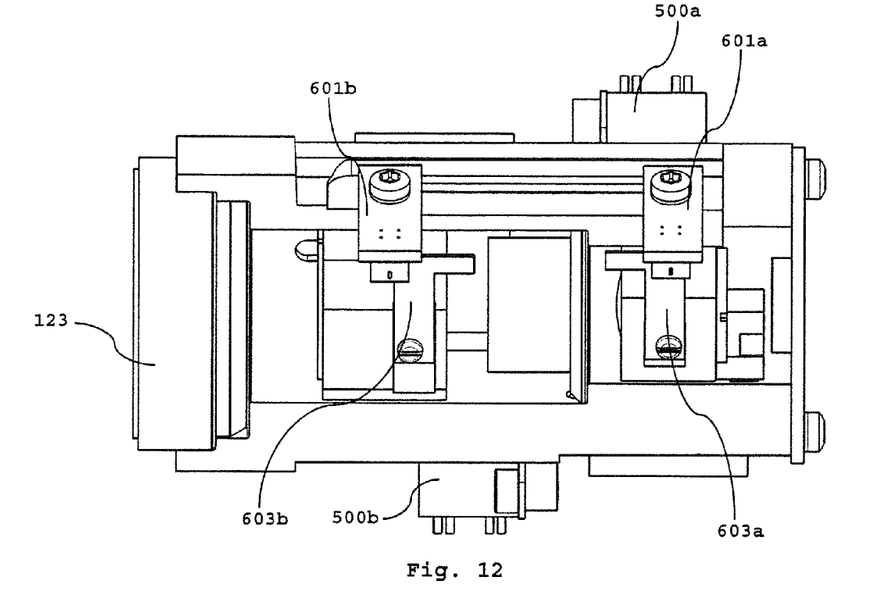
FIG. 12 shows the optical guide system according to FIG. 10 in another perspective view, the system being rotated here at approximately 180 degrees in relation to the optical axis.

FIGS. 10, 11 and 12 show perspective views of an optical guide system according to a further embodiment. As shown by FIG. 10, two drives 500a and 500b which correspond to the drive 500 described above are provided on the exterior of the optical guide system. As a person skilled in the art would understand, other suitable drives can also be used in all embodiments of the invention. As can also be seen from the figure, these drives can be linked to corresponding coupling carriages 400a and 400b.

Thus, the embodiment shown by way of example in these figures comprises two lens groups (see FIG. 13, bottom) which are arranged movably within a guide housing 110' by means of the drives 500a and 500b. In the embodiment shown, the lens arrangement also comprises non-movable lenses such as, for example, the lens of the objective 123 as shown.

FIG. 11 shows the optical guide system according to FIG. 10 in a rotated view. It is apparent here that a CCD chip 170 is provided arranged opposite the objective 123. This CCD chip 170 serves to record the image generated by the lens arrangement and to store the image with a suitable computer connected thereto. Alternatively, in place of the CCD chip 170, a further lens or lens group of an eyepiece can be provided.

FIG. 12 shows a further view of the optical guide system of FIGS. 10 and 11 which is rotated by approximately 180 degrees about the optical axis of the system. Thus, the side of the guide system which lies opposite the side visible in FIGS. 10 and 11 is visible. On this side, the light barriers 601a and 601b and corresponding interrupter elements 603a and 603b are visible, wherein the interrupter elements 603a and 603b can move with the corresponding lens groups along the optical axis.

Figure 13:
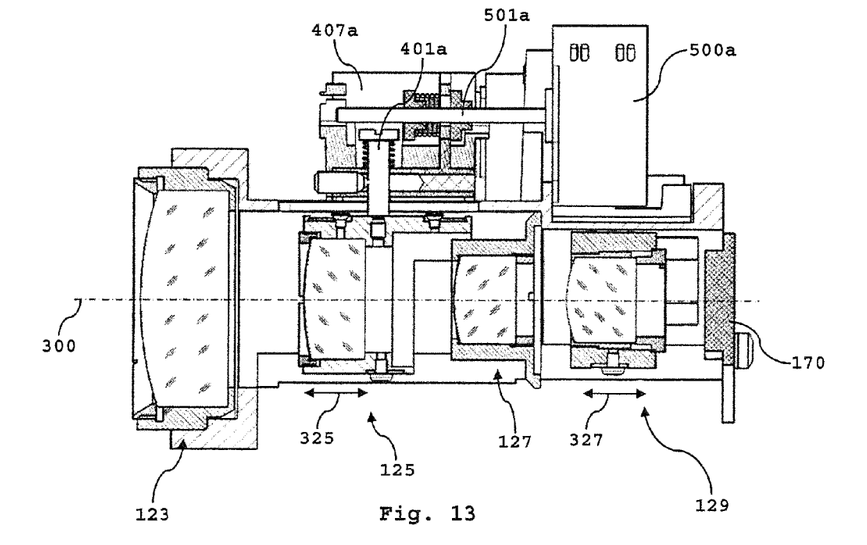
FIG. 13 shows a cross-sectional view of the optical guide system of FIG. 10.

FIG. 13 shows a cross-sectional view of the optical guide system of FIGS. 10 to 12. Herein, the system has again been rotated about the optical axis so that only the drive 500a is visible. In this cross-sectional view, a drive shaft 501a and a suspension element 401a are visible within the coupling carriage 407a. As shown in this drawing, the lens arrangement comprises a plurality of lens groups, i.e. an objective lens group 123, a zoom lens group 125, a fixed lens group 127 and a focusing lens group 129. The objective lens group 123 and the fixed lens group 127 are not movable and the zoom lens group 125 and the focusing lens group 129 are arranged movably along the optical axis 300 of the system. This movability and the movement direction are indicated by the arrows 325 and 327.

The invention claimed is:

1. An optical guide system for guiding at least one optical lens along an optical axis of the guide system, wherein the optical guide system comprises:
   a guide housing for accommodating a guide carriage within the guide housing, wherein an inner guide surface of the guide housing extends along the optical axis,
   wherein the guide carriage is arranged within the guide housing movably along the optical axis between a start position and an end position and is suitable for securing the at least one optical lens,
   wherein the guide carriage comprises at least one sliding element which is in contact with the inner guide surface of the guide housing and enables sliding of the guide carriage within the guide housing along the optical axis, and
   wherein the optical guide system also has a suspension element which is mechanically connected to the guide carriage and by means of which the guide carriage is mechanically coupled through a cut-out in the guide housing to a drive outside the guide housing;
   characterized in that
   the optical guide system also has a tensioning element which is arranged outside the guide housing and which cooperates with the suspension element, thereby causing a tensioning force which acts on the guide carriage so that the at least one sliding element lies against the inner guide surface of the guide housing.

2. The optical guide system as claimed in claim 1, characterized in that the optical guide system also comprises a coupling carriage which is movably arranged at an outer surface of the guide housing, and is connected to the drive in such a way that, on a rotary movement of a drive shaft of the drive, said coupling carriage is moved linearly along the optical axis, wherein the suspension element is mechanically connected to the coupling carriage.

3. The optical guide system as claimed in claim 1, characterized in that the tensioning element is arranged between a contact surface of the coupling carriage and a holding projection of the suspension element, and that the tensioning force is transmitted by means of the suspension element to the guide carriage so that the at least one sliding element is pressed against the inner guide surface of the guide housing such that said sliding element is able to slide in relation to the guide surface.

4. The optical guide system as claimed in claim 1, characterized in that the coupling carriage comprises a support section which encompasses the contact surface, wherein the suspension element extends through a suspension aperture in the support section substantially perpendicularly to the optical axis through the cut-out such that the spring is compressed between the annular projection of the suspension element and the contact surface such that a spring force acts on the suspension element, preferably in a direction substantially perpendicular to the optical axis from within the guide housing to outside the guide housing.

5. The optical guide system as claimed claim 1, characterized in that the coupling carriage also comprises a holding spring element, preferably a spring bolt, which is arranged on the coupling carriage such that within the suspension opening, said holding spring element exerts a spring force on the suspension element, preferably in a direction substantially parallel to the optical axis.

6. The optical guide system as claimed in claim 1, characterized in that the inner guide surface of the guide housing along the optical axis is substantially cylindrical, preferably with an essentially circular cross-section, wherein, through the effect of the tensioning force, the at least one sliding element lies against a first half-cylindrical surface of the cylindrical guide surface and a spacing exists between the guide carriage and a second half-cylindrical surface of the cylindrical guide surface which lies opposite the first half-cylindrical surface in relation to the optical axis.

7. The optical guide system as claimed in claim 1, characterized in that the guide carriage preferably has at least one cylindrical section with an essentially cylindrical basic form, preferably with an essentially circular internal cross-section.

8. The optical guide system as claimed in claim 1, characterized in that the guide carriage has at least one cylinder segment section which has a cross-section which is essentially a circular segment, wherein the at least one cylinder segment section extends from the cylindrical section essentially along the optical axis.

9. The optical guide system as claimed in claim 1, characterized in that at least one section of the at least one sliding element extends from the at least one cylinder segment section along a curvature of the first half-cylindrical surface and lies thereagainst.

10. The optical guide system as claimed in claim 1, characterized in that the guide carriage has two cylinder segment sections which extend from the cylindrical section in opposing directions along the optical axis, wherein preferably each cylinder segment section has at least one sliding element which extends from the cylinder segment section in the direction of the inner guide surface of the guide housing.

11. The optical guide system as claimed in claim 1, characterized in that the one sliding element extends essentially along the whole cross-section of the cylinder segment section.

12. The optical guide system as claimed in claim 1, characterized in that the inner guide surface of the guide housing along the optical axis is a cylinder with an essentially circular cross-section.

13. The optical guide system as claimed in claim 1, characterized in that the cylindrical section is essentially a hollow cylinder with an essentially circular internal cross-section and is configured to accommodate the lens.

14. The optical guide system as claimed in claim 1, characterized in that the cylindrical section has an outer guiding surface with an essentially polygonal cross-section which extends essentially along the optical axis, wherein the sliding elements of this outer guiding surface extend contrary to the inner guide surface of the guide housing.

15. The optical guide system as claimed in claim 1, characterized in that the optical guide system comprises a light barrier and an interrupter element,
wherein the light barrier is arranged on the guide housing or on the guide carriage and the interrupter element is arranged on the corresponding other guide housing or guide carriage,
wherein the interrupter element is arranged and configured such that, during a movement of the guide carriage from the start position to the end position, the interrupter element is guided between a light emitting section and a light receiving section of the light barrier, and thereby changes a signal of the light barrier by means of at least partial transmission or at least partial interruption of a light beam of the light barrier such that the light barrier emits a different signal when the guide carriage is in the start position than when the guide carriage is in the end position,
and in that, during a unidirectional movement of the guide carriage between the start position and the end position, the signal of the light barrier at least partially reverses at least three times.

16. The optical guide system as claimed in claim 1, characterized in that the interrupter element comprises an interrupter section which extends essentially along the optical axis, wherein the light transmission section is arranged close to one end of the interrupter section along the optical axis.

17. The optical guide system as claimed in claim 1, characterized in that the interrupter element is arranged on the guide carriage.

18. The optical guide system as claimed in claim 1, characterized in that the drive is a stepper motor.

19. The optical guide system as claimed in claim 1, characterized in that the light barrier is arranged, in relation to the optical axis, substantially centrally between the start position and the end position and in that preferably the dimension of the interrupter section along the optical axis substantially corresponds to half a length of the guide housing along the optical axis.

20. A total station with an optical guide system as claimed in claim 1.

* * * * *